United States Patent
Hoang et al.

(10) Patent No.: US 7,526,611 B2
(45) Date of Patent: Apr. 28, 2009

(54) UNIFIED PROCESSOR CACHE MODEL IN MULTIPROCESSOR SYSTEM

(75) Inventors: Anh-Tuan Nguyen Hoang, Rochester, MN (US); Christopher Tung Phan, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 11/386,629

(22) Filed: Mar. 22, 2006

(65) Prior Publication Data

US 2007/0226421 A1    Sep. 27, 2007

(51) Int. Cl.
*G06F 12/00* (2006.01)

(52) U.S. Cl. ...................... 711/130; 711/144

(58) Field of Classification Search ............. 711/130, 711/144
See application file for complete search history.

(56) References Cited

U.S. PATENT DOCUMENTS

| | | | |
|---|---|---|---|
| 6,240,490 B1 | 5/2001 | Lyles, Jr. et al. | 711/141 |
| 2002/0174253 A1* | 11/2002 | Hayter et al. | 709/250 |
| 2006/0059196 A1* | 3/2006 | Sato et al. | 707/104.1 |

* cited by examiner

*Primary Examiner*—Brian R. Peugh
*Assistant Examiner*—Victor W Wang
(74) *Attorney, Agent, or Firm*—Cantor Colburn LLP

(57) ABSTRACT

Exemplary embodiments include a multiprocessor system including: a plurality of processors in operable communication with an address manager and an memory controller; and a unified cache in operable communication with the address manager, wherein the unified cache includes: a plurality of cache addresses; a cache data corresponding to each cache address; a data mask corresponding to each cache data; a plurality of cache agents corresponding to each cache address; and a cache state corresponding to each cache agent.

1 Claim, 3 Drawing Sheets

UNIFIED PROCESSOR CACHE MODEL IN MULTIPROCESSOR SYSTEM

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Field of the Invention

The present invention relates in general to caching for multiprocessor system design simulation and in particular to a unified processor cache model.

2. Description of Background

Caches have traditionally been designed to take advantage of the spatial and temporal locality of code sequences in commercial applications to reduce the memory access latency for load and store instructions by staging data predicted to be needed in the future into smaller memories having shorter latencies. As multiprocessing capabilities have increased in popularity, cache structures have been expanded and improved to support this functionality.

In a multiprocessor system, the same data may be shared and separately cached by different processors. To address the problem of multiple processors modifying the same data in local caches without notifying the other, various cache states have been defined and included into the cache organization to support different cache coherency protocols in snooping mechanisms. While many different cache coherency states have been defined for different multi-processor systems, the MESI protocol states remain very popular basic cache coherency states.

In a multiprocessor system having a multi-level cache hierarchy, the number of legal combinations for cache coherency states among the caches is extremely large. Even if a very thorough methodology were employed, it would not be easy to reach all of the legal combinations by running limited simulation cycles, as is conventional. Some legal combinations may only occur after execution of a complex sequence of many load, store and castout operations.

For instance, in order for data X within the level one (L1) and level two (L2) caches to be in the invalid state in both but in the modified state in the level three (L3) cache, the processor must first store data X to the appropriate address, causing the L1 to be in the modified state. Next, a number of loads or stores (depending on the L1's replacement algorithm) must be executed which map to the cache segment containing addresses including that of data X, forcing a castout of X from the L1 to the L2. Finally, a number of loads and stores that cause L1 misses and also force the L2 to select data X as the victim and castout the cache line containing the modified data from the L2 to the L3 must occur.

Currently in a multiprocessor simulation environment, each processor behavior has its own cache model. It is therefore possible to have multiple copies of the same data being cached in multiple models. As the system grows, more processor behaviors will be added to the simulation environment. This will take up more memory and make coherency checking of the whole system more difficult and inefficient. The use of a Unified Processor Cache Model reduces memory usage, simplifies coherency checking, and allows access to cache states and data more quickly and efficiently.

SUMMARY

Exemplary embodiments include a multiprocessor system including: a plurality of processors in operable communication with an address manager and an memory controller; and a unified cache in operable communication with the address manager, wherein the unified cache includes: a plurality of cache addresses; a cache data corresponding to each cache address; a data mask corresponding to each cache data; a plurality of cache agents corresponding to each cache address; and a cache state corresponding to each cache agent.

Other exemplary embodiments include a multiprocessor system including: a plurality of processors in operable communication with an address manager and an memory controller; a unified cache in operable communication with the address manager, wherein the unified cache includes: a plurality of cache addresses; a cache data corresponding to each cache address; a data mask corresponding to each cache data; a plurality of cache agents corresponding to each cache address; and a cache state corresponding to each cache agent; wherein the unified cache maintains the cache address associated with each processor for the cache data; and wherein the unified cache maintains a cache agent and a corresponding cache state associated with each processor for each cache data.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution in which a multiprocessor system utilizes a unified cache thereby saving memory space.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Figure 1:
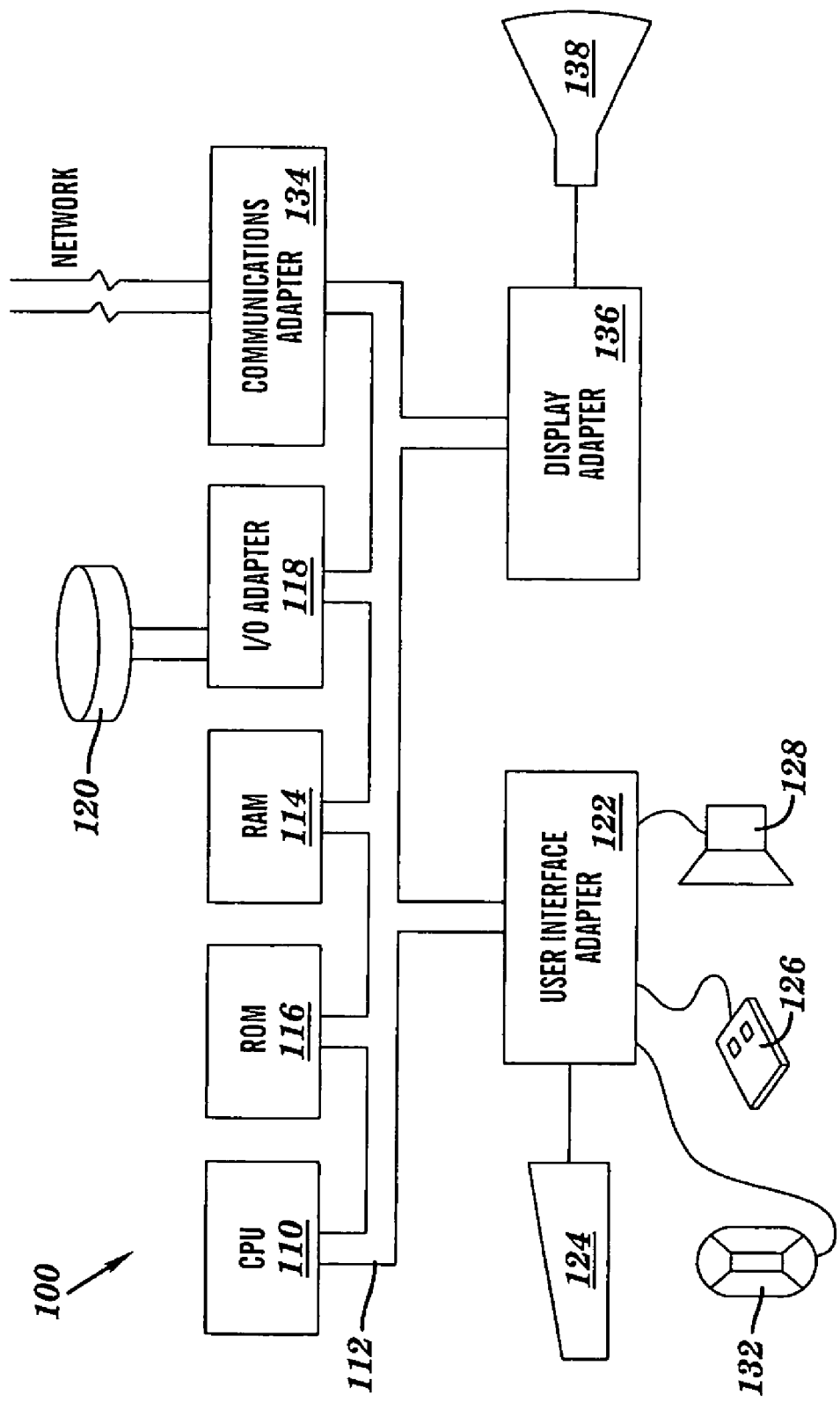
FIG. 1 illustrates one example of a data processing system.

Referring to FIG. 1, an example is shown of a data processing system 100 which may be used for the invention. The system has a central processing unit (CPU) 110, which is coupled to various other components by system bus 112. Read only memory ("ROM") 116 is coupled to the system bus 112 and includes a basic input/output system ("BIOS") that controls certain basic functions of the data processing system 100. Random Access Memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display adapter 136 connects display monitor 138 to system bus 112. In this manner, a user is capable of inputting to the system throughout the keyboard 124, trackball 132 or mouse 126 and receiving output from the system via speaker 128 and display 138.

Exemplary implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Figure 2:
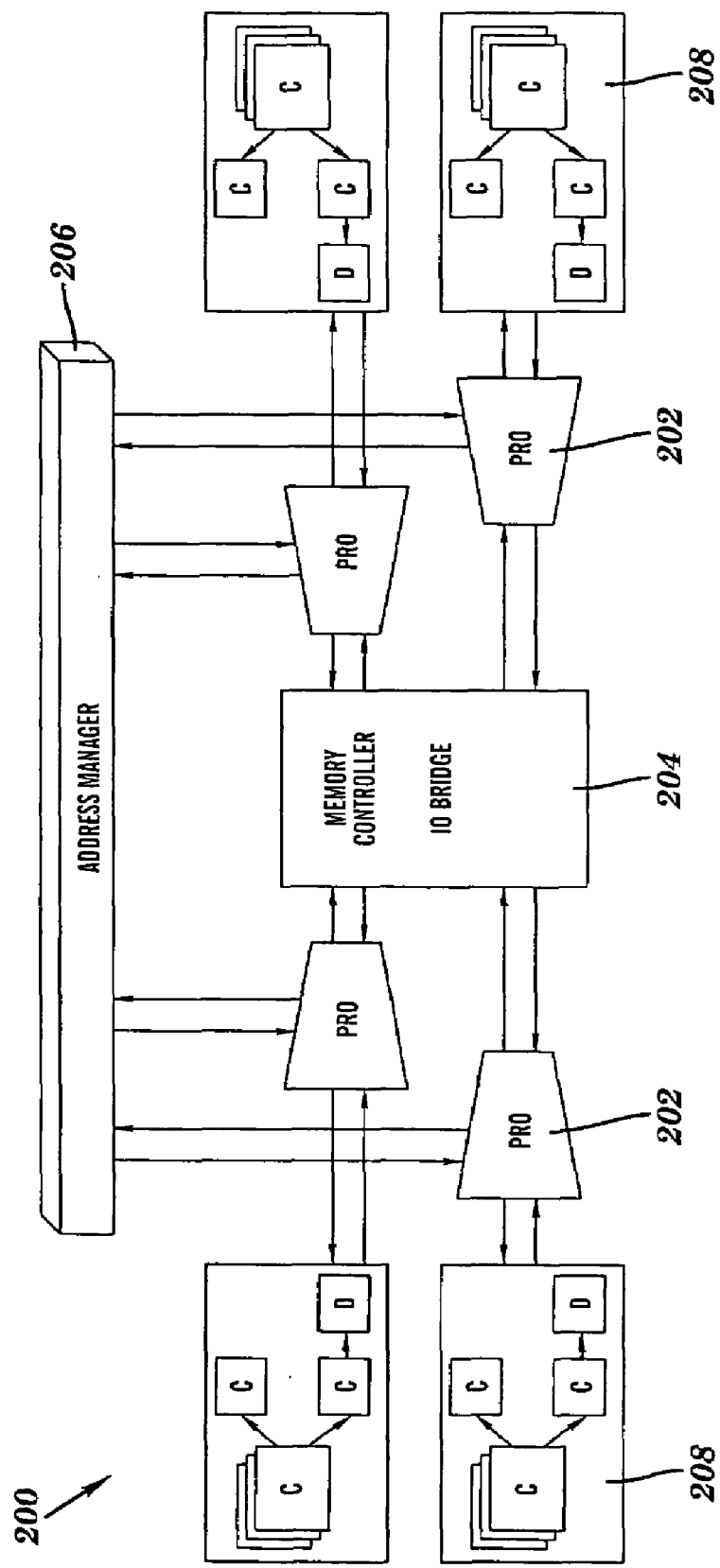
FIG. 2 illustrates one example of a traditional processor cache model in a multiprocessor system simulation.

Turning to FIG. 2, a traditional processor cache model in a multiprocessor system simulation is generally depicted as 200. The system 200 includes a plurality of processors 202, a memory controller 204, an address manager 206, and a plurality of cache 208. As shown, each processor 202 has its own cache 208. In the system 200, the same data may be shared and separately cached by different processors 202. To prevent multiple processors 202 modifying the same data in local caches 208 without notifying the other processors, various cache states have been defined and included into the cache organization to support different cache coherency protocols in snooping mechanisms. The modified (M) coherency state indicates that only one cache has the valid copy of the data, and that copy is "dirty" or modified with respect to the copy in system memory. The exclusive (E) coherency state is defined to signify that only one cache has a valid copy of the data, which is unmodified with respect to the data in system memory. The shared (S) coherency state denotes that one or more caches have copies of the data and that no copy is modified with respect to system memory. The invalid (I) coherency state indicates that no caches have a valid copy of the data.

In multiprocessor systems 200 employing the MESI protocol or a variant, a processor 202 preparing to store data will first examine the cache coherency state within the cache 208 corresponding to the store location. If the subject cache line is either modified or exclusive, the store will be performed immediately. Otherwise, the processor 202 seeking to store the data must invalidate all other copies of the data in the memory hierarchy before the store may be safely executed. All processors 202 follow these protocols in a multiprocessor system to ensure that data coherency with respect to instruction execution sequences is maintained.

Figure 3:
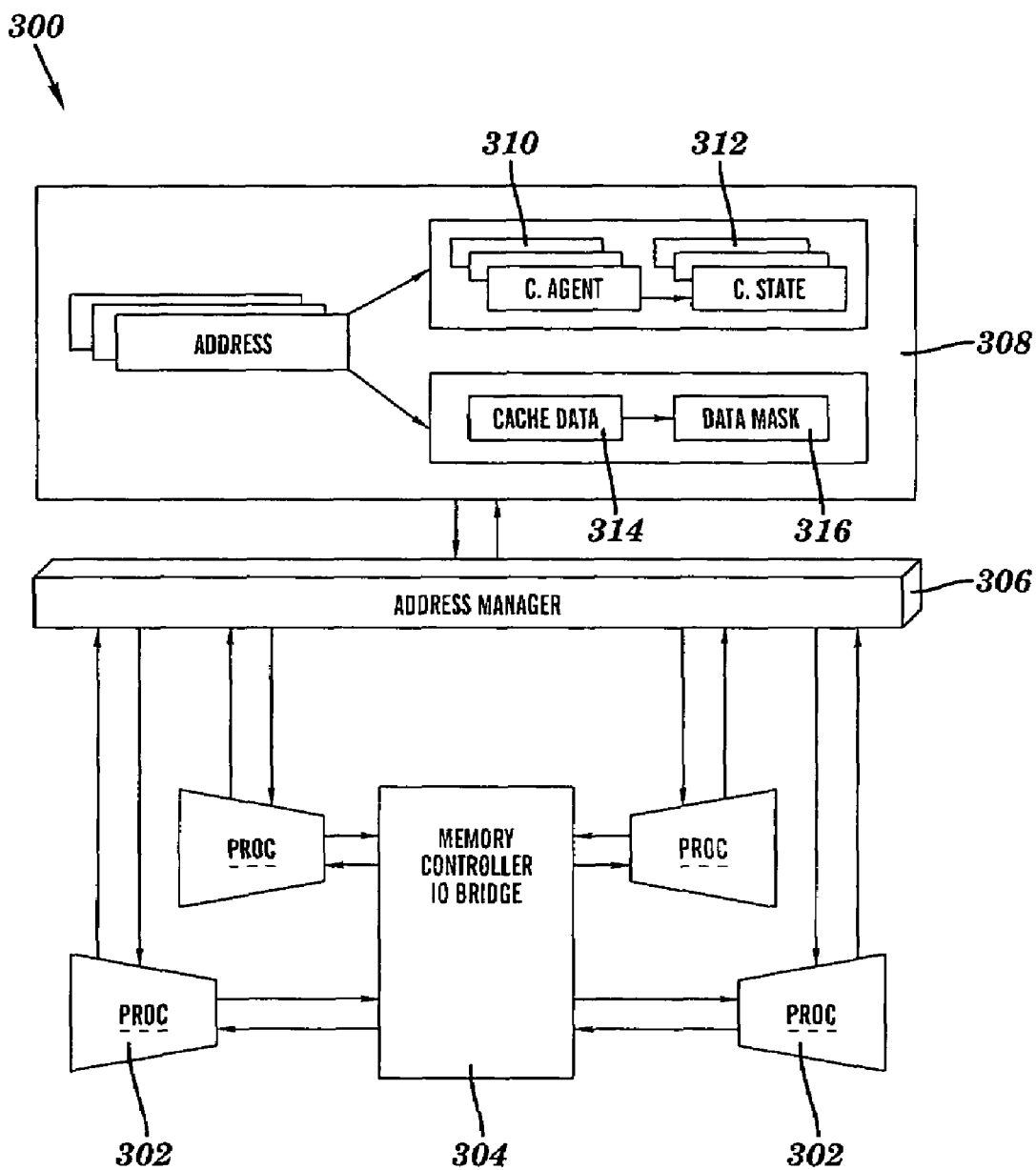
FIG. 3 illustrates one example of a unified processor cache model in a multiprocessor system simulation.

Referring now to FIG. 3 a unified processor cache model in a multiprocessor system simulation in accordance with exemplary embodiments is generally depicted as 300. The system 300 includes a plurality of processors 302, a memory controller 304, an address manager 306, and a unified cache 308. As shown, each processor 302 utilizes the unified cache 308. In one embodiment, the unified cache 308 coherency follows the MESI protocol described above. The unified cache 308 keeps track of all coherent memory addresses that are supposedly being cached in the processors' internal cache. For each coherent address, the unified cache 308 maintains a list of the caching agents 310 with their cache states 312 associated with the address along with one valid copy of the data 314 with its data mask 316.

Since only one valid copy of the cache data 314 is being stored for all caching agents 310, significant memory space is saved as the system 300 grows. In addition, having cache states 312 centralized in one place reduces the complexity of the on-the-fly and post checking which in turn makes it more efficient to verify the coherency protocol. When a processor 302 fetches the cache data 314, the unified cache 308 will return random data if the cache state 312 associated with the caching agent 310 is invalid, otherwise the unified cache 308 will return the valid cache data 314. When a processor 302 wants to update a cache line with new data, its cache state 312 will be checked against all other caching agents' 310 cache states 312 before the store is allowed to update the cache data 314.

In response to a cache store command the unified cache 308 checks the cache state 312 of the cache line. If the cache state 312 of the cache line is modified or exclusive the unified cache 308 verifies that the cache state 312 of all other caching agents' 310 is invalid before storing the new data. If the cache state 312 of the cache line is shared and the cache state 312 of all other caching agents 310 are invalid the unified cache 308 stores the new data. If the cache state 312 of the cache line is shared and the cache state 312 of all other caching agents 310 is not invalid the unified cache 308 verifies that the cached data 314 and the data to be stored are the same.

In response to a cache fetch command the unified cache 308 checks the cache state 312 of the requested cache line. If the cache state 312 is not invalid, the unified cache 308 will return the requested cached data 314. If the cache state 312 is invalid, the unified cache 308 will return random data or a predefined initialized data pattern. In response to a data verification command the unified cache 308 will verify that the cache data 314 matches the data given if none of the cache states 312 of all other caching agents 310 are modify and alt least one cache state 312 of the other caching agents 310 is not invalid. In response to a state verification command the unified cache 308 ensures that if the cache state 312 of one of the caching agents 310 is modify or exclusive the cache states 312 of the other caching agents 310 must be invalid. Likewise, if the cache state 312 of one of the caching agents 310 is shared the cache states 312 of the other caching agents 310 must be either shared or invalid.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A multiprocessor system comprising:
    a plurality of processors in operable communication with an address manager and a memory controller;
    a unified cache in operable communication with the address manager, wherein the unified cache comprises:
        a plurality of cache addresses;
        a cache data corresponding to each cache address;
        a data mask corresponding to each cache data;
        a plurality of cache agents corresponding to each cache address; and
        a cache state corresponding to each cache agent wherein the unified cache stores only one valid copy of the cache data for the plurality of cache agents;
    wherein the unified cache maintains the cache address associated with each processor for the cache data;
    wherein the unified cache maintains a cache agent and a corresponding cache state associated with each processor for each cache data;
    wherein the cache state is one of following: modify; exclusive; shared; or invalid;
    wherein the unified cache executes a cache store instruction comprising determining the cache state of each cache agent corresponding to a cache line and responsively storing a new cache data the cache line comprising: a first cache address; a first cache data corresponding to the first cache address; a first data mask corresponding to the first cache data; at least a first and second cache agents corresponding to the first cache address; and at least a first and second cache states corresponding to the at least first and second cache agents, respectively;
    wherein the unified cache executes a cache fetch instruction comprising determining the cache state of each cache agent corresponding to the cache line and responsively returning the cache data or a predefined initialized data pattern,
    wherein the unified cache is configured to:
        in response to receiving a cache store command, checking a cache state of a cache line of new cache data from the cache store command;
        if the cache state of the cache line is modified, verifying that the cache state of all other caching agent is invalid before storing the new cache data;
        if the cache state of the cache line is shared and the cache state of all other caching agents are invalid, storing the new data;
        if the cache state of the cache line is shared and the cache state of all other caching agents is not invalid, verifying that the cached data and the data to be stored are the same;
        in response to receiving a cache fetch command, checking the cache state of a requested cache line;
        if the cache state is not invalid, returning requested cached data;
        if the cache state is invalid, returning random data or a predefined initialized data pattern;
        in response to receiving a data verification command, verifying that the cache data matches data given if none of the cache states of all other caching agents are modify and at least one cache state of the other caching agents is not invalid;
        in response to receiving a state verification command, checking that if the cache state of one of the caching agents is modify or exclusive the cache states of the other caching agents must be invalid; and
        if the cache state of one of the caching agents is shared, checking that the cache states of the other caching agents is shared or invalid.

* * * * *